United States Patent [19]

Bordignon

[11] Patent Number: 4,882,645
[45] Date of Patent: Nov. 21, 1989

[54] MASK STRUCTURE FOR CASSETTES OF MAGNETIC TAPE

[75] Inventor: Abramo Bordignon, Senago, Italy

[73] Assignee: A.T.B. S.p.A., Senago, Italy

[21] Appl. No.: 124,192

[22] Filed: Nov. 23, 1987

[30] Foreign Application Priority Data

Dec. 4, 1986 [IT] Italy ................................ 23924/86[U]

[51] Int. Cl.⁴ .............................................. G11B 23/02
[52] U.S. Cl. ................................................... 360/132
[58] Field of Search ......................... 360/132; 242/199

[56] References Cited

U.S. PATENT DOCUMENTS

| 4,102,515 | 7/1978 | Milants | 242/199 |
| 4,438,892 | 3/1984 | Fetterer | 360/132 X |
| 4,535,434 | 8/1986 | Kishi | 369/111 |
| 4,563,718 | 1/1986 | Shirako | 360/132 |

FOREIGN PATENT DOCUMENTS 936832 6/1982 U.S.S.R. .

Primary Examiner—A. J. Heinz
Attorney, Agent, or Firm—Guido Modiano; Albert Josif

[57] ABSTRACT

The mask comprises a sheet-like element having formed therein a pair of holes positionable at the hubs of a magnetic tape cassette. The holes have perimetral portions adapted to engage folded edges of openings defined by each half-shell of the cassette at the hubs. The perimetral portions are adapted to assume a curved form with concavity directed towards the hubs of the magnetic tape cassette upon said mask being coupled with one of said half-shells.

2 Claims, 1 Drawing Sheet

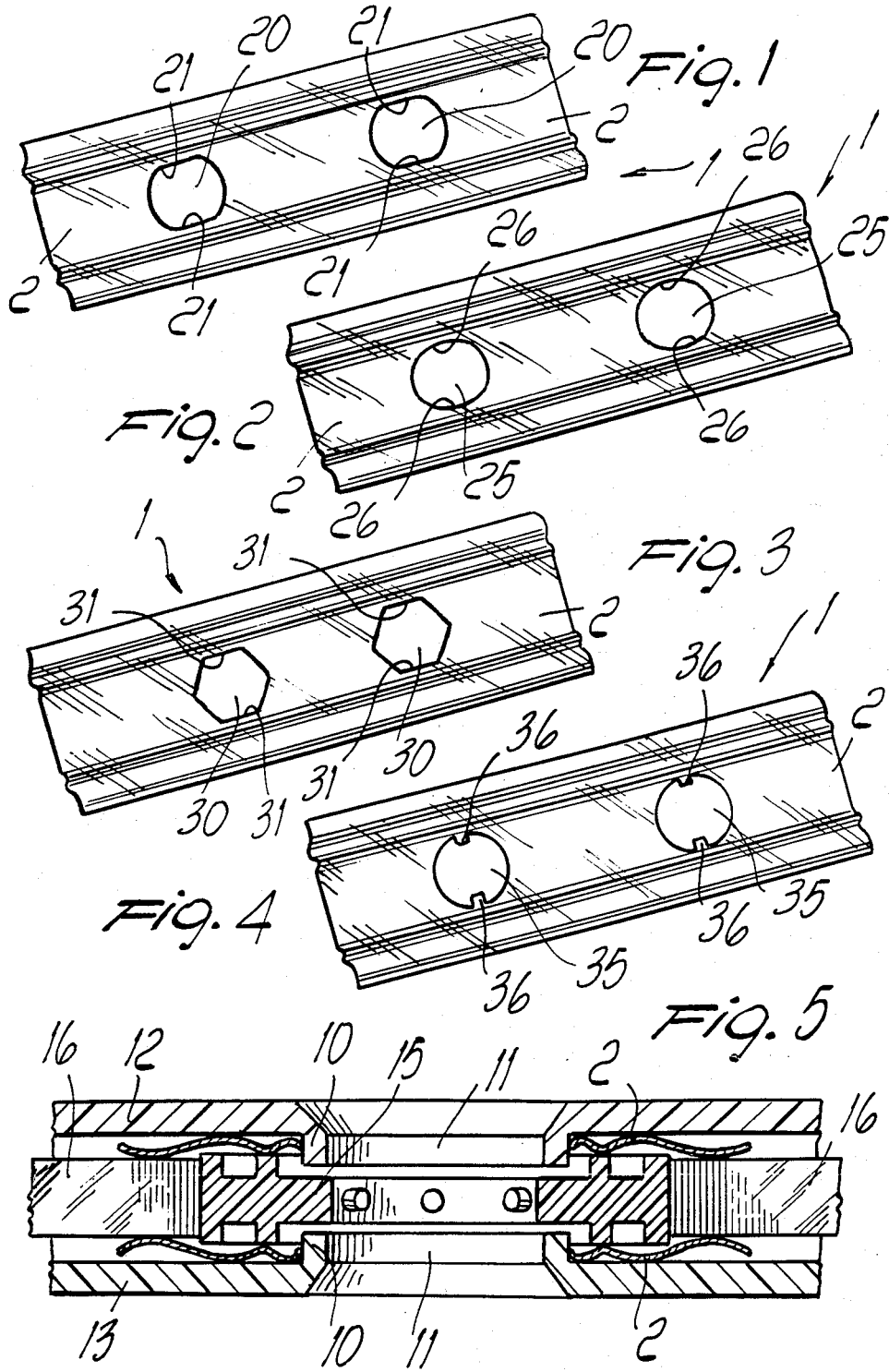

MASK STRUCTURE FOR CASSETTES OF MAGNETIC TAPE

BACKGROUND OF THE INVENTION

The present invention relates to a mask structure for cassettes of magnetic tape with means for locking with respect to the box-like shell.

As is known, cassettes of magnetic tape are constituted by a box-like shell produced by means of two mutually associable half-shells, which define in their interior the region of accommodation of the hubs on which the magnetic tape winds and unwinds.

In order to correctly locate the hubs inside the box-like shell, masks are conventionally used which are constituted by sheet-like elements possibly shaped and covered with portions of material with low friction coefficient, which are interposed between the axial ends of the reel of magnetic tape and the inner wall of the box-like shell.

In order to position the masks with respect to the half-shells, so as to prevent said masks from moving during the step of coupling of the two half-shells, one or more holes were provided, generally located in the peripheral regions of the mask, with which studs engaged which, slightly forcing into said holes, created a force for the retention of the mask with respect to the half-shells, so as to prevent the displacement of the mask during the step of overturning of the half-shells for their mutual coupling.

This solution has been abandoned in the course of time, since it is scarcely practical from a functional point of view and poorly accepted from an aesthetical point of view, since said stud was clearly visible from outside.

In order to solve the problem using automatic packaging machines, the method was subsequently introduced of slightly wetting or dampening the surface of the mask in contact with the half-shell, so as to have an at least temporary adhesion, required to maintain the coupling between the mask and the half-shell during the assembly step.

Even this solution, however, is not free from disadvantages, since it is not infrequent that the unstable adhesion, determined by the wetting of the sheet-like element or by other methods or experiences currently in use, lead to an uncoupling of the sheet-like element from the half-shell; moreover, the wetting of the sheet-like element unavoidably creates residual humidity in the cassette.

SUMMARY OF THE INVENTION

The aim proposed by the invention is indeed to solve the above described problem, by providing a mask structure which is easily connectable to the related half-shell, without having to provide modifications in the half-shell, such as the presence of studs, pins or the like.

Within the scope of the above described aim, a particular object of the invention is to provide a mask which, besides solving the problem of its connection to the half-shell during the step of overturning for the manufacture of the box-like shell, is capable of positioning itself perfectly with respect to said half-shell in a substantially stable manner, thus keeping this positioning even during the phases of use of the cassette.

Still another object of the present invention is to provide a mask structure which, though having considerably improved functional characteristics, does not thereby have constructive complications or additional costs.

Not least object of the present invention is to provide a mask structure which can have any surface configuration deemed suitable, and which furthermore is easily applicable to any type of box-like shell of a cassette for magnetic tapes.

The above described aim, as well as the objects mentioned and others which will become apparent hereinafter are achieved by a mask structure for magnetic tape cassette according to the appended claim.

BRIEF DESCRIPTION OF THE DRAWINGS

Further characteristics and advantages of the invention will become apparent from the detailed description of a mask structure for cassettes of magnetic tape with means for locking with respect to the box-like shell, illustrated only by way of non-limitative example in the accompanying drawings, wherein:

FIG. 1 is a view of a mask with holes having mutually parallel diametral portions;

FIG. 2 is a view of a mask with ovalized holes;

FIG. 3 is a view of a mask with substantially hexagonal holes;

FIG. 4 is a view of a mask with holes having counterposed tabs; and

FIG. 5 is a cross view of a mask applied to a cassette of magnetic tape.

DESCRIPTION OF THE PREFERRED EMBODIMENTS

With reference to the above described figures, the mask structure for magnetic tape cassette with means for locking with respect to the box-like shell, according to the invention, generally indicated by the reference numeral 1, has a sheet-like element 2 which can have any configuration deemed suitable and which, advantageously, can be of the type disclosed in a concurrently filed patent application in the name of the same applicant.

The peculiarity of the invention resides in the fact that the sheet-like element 2 defines a pair of through holes which have peripheral portions which are capable of engaging with the annular folded edges 10 of the openings 11 which are defined by the half-shells 12 and 13 of the cassette for magnetic tape, respectively at the hubs 15 on which the magnetic tape 16 winds.

According to what is illustrated in FIG. 1, a hole 20 is provided, having a substantially circular configuration, which has two counterposed peripheral portions constituted by rectilinear portions 21 interfering with the circular configuration. In this manner the rectilinear portions 21, which have a mutual distance which is smaller that the outer diameter of the folded edges 10, elastically engage with said folded edges, creating a fold during the application step which produces an elastic force which retains said mask in contact with the half-shell, even in the steps of overturning of the half-shell for mutual coupling.

The same functional effect can be obtained by means of ovalized or elleptical holes 25 wherein the engagement portions are constituted by the portions of the minor axis which have a smaller span with respect to the outer diameter of the folded edges 10.

A similar effect is also obtainable with holes 30 with a polygonal configuration, in which at least two substantially counterposed sides have a mutual distance which is smaller than the outer diameter of the folded edges 10.

In FIG. 4, the mask 1 has holes 35 which are provided with two radial tabs 36, which may be arranged in a counterposed diametral position, in the case of two tabs, or possibly also variously distributed, in the case of a plurality of tabs, and which have such a mutual distance as to engage by elastic contact with the outer surface of the folded edges 10, obtaining the same effect described above.

To the above one must furthermore add that by applying the mask on the half-shell the fold created in the perimetral portions, upon engagement with the folded edge 10, has its concavity facing towards the reel of the cassette, so that the edges which delimit the holes provided on the sheet-like element constituting the mask tend to lie langentially to and to "jam" with the folded edge 10, impeding uncoupling of the mask from said folded hole.

From the above it can thus be seen that the invention achieves the intended aim and objects, and in particular the fact is stressed that a mask is provided which is capable of elastically anchoring to the related half-shell, without having to provide structural modifications in the half-shells constituting the cassette or without having to resort to expedients such as the wetting or the like of the surface of the mask to make it at least temporarily adherent to the half-shell.

Furthermore, the coupling obtained by virtue of the perimetral portions interfering with the folded edge has the function of better positioning said mask inside the cassette.

In practice, the materials employed, so long as compatible with the specific use, as well as the dimensions and the contingent shapes, may be any according to the requirements.

I claim:

1. In a magnetic tape cassette of the type comprising a box-like housing formed of two half-shells, a pair of hubs rotatably located within said housing, a magnetic tape wound on at least one of said hubs, a pair of through apertures formed on said housing coaxially with said hubs to allow passage of drive spindles of a cassette recorder or the like, said through apertures having annular folded edges at least partially projecting inwardly of said housing, said annular folded edges defining a substantially cylindrical outer surface having an outer diameter;

a mask structure to be arranged inside said housing and comprising a pair of sheet-like elements positionable between said hubs and said half-shells, said sheet-like element having a pair of holes located concentrically with said housing apertures to allow insertion of said annular folded edges therethrough, and further comprising means for removably fastening said sheet-like elements to said housing, wherein said fastening means comprise peripheral portions of said holes which project at least partially inwardly thereof to radially interfere with said outer cylindrical surface of said annular folded edges and to thereby resiliently and frictionally engage therewith, whereby said sheet-like elements are at least temporarily secured to said half-shells during mutual coupling thereof, having a substantially elliptical configuration defining a major axis and a minor axis perpendicular therebetween, said major and said minor axes being respectively larger and smaller than said outer diameter of said annular folded edges.

2. A magnetic tape cassette of the type comprising a box-like housing formed of two half-shells, a pair of hubs rotatably located within said housing, a magnetic tape wound on at least one of said hubs, a pair of through apertures formed on said housing coaxially with said hubs to allow passage of drive spindles of a cassette recorder or the like, said through apertures having annular folded edges at least partially projecting inwardly of said housing, said annular folded edges defining a substantially cylindrical outer surface having an outer diameter;

a mask structure to be arranged inside said housing and comprising a pair of sheet-like elements positionable between said hubs and said half-shells, said sheet-like element having a pair of holes located concentrically with said housing apertures to allow insertion of said annular folded edges therethrough, and further comprising means for removably fastening said sheet-like elements to said housing, wherein said fastening means comprise peripheral portions of said holes which project at least partially inwardly thereof to radially interfere with said outer cylindrical surface of said annular folded edges and to thereby resiliently and frictionally engage therewith, whereby said sheet-like elements are at least temporarily secured to said half-shells during mutual coupling thereof, said holes having a substantially polygonal configuration with at least a diagonal larger than said outer diameter of said annular folded edges, the minimum distance between at least one pair of the opposite sides of said polygonal holes being smaller than said outer diameter of said annular folded edges.

* * * * *

UNITED STATES PATENT AND TRADEMARK OFFICE
CERTIFICATE OF CORRECTION

PATENT NO. : 4,882,645
DATED : Nov. 21, 1989
INVENTOR(S) : Abramo Bordignon

It is certified that error appears in the above-indentified patent and that said Letters Patent is hereby corrected as shown below:

In column 4, line 13, add —said holes— before "having".

Signed and Sealed this

Sixteenth Day of August, 1994

Attest:

BRUCE LEHMAN

*Attesting Officer*    *Commissioner of Patents and Trademarks*